United States Patent
Kawashima

(10) Patent No.: US 9,466,904 B2
(45) Date of Patent: Oct. 11, 2016

(54) METHOD FOR MANUFACTURING TERMINAL, AND TERMINAL

(71) Applicant: DENSO CORPORATION, Kariya, Aichi-pref. (JP)

(72) Inventor: Seizaburou Kawashima, Anjo (JP)

(73) Assignee: DENSO CORPORATION, Kariya (JP)

( * ) Notice: Subject to any disclaimer, the term of this patent is extended or adjusted under 35 U.S.C. 154(b) by 55 days.

(21) Appl. No.: 14/424,461

(22) PCT Filed: Nov. 5, 2013

(86) PCT No.: PCT/JP2013/006509
§ 371 (c)(1),
(2) Date: Feb. 27, 2015

(87) PCT Pub. No.: WO2014/080579
PCT Pub. Date: May 30, 2014

(65) Prior Publication Data
US 2015/0207253 A1    Jul. 23, 2015

(30) Foreign Application Priority Data

Nov. 23, 2012  (JP) .................................. 2012-256972
Jun. 14, 2013  (JP) .................................. 2013-125968

(51) Int. Cl.
*H01R 13/58*     (2006.01)
*H01R 13/02*     (2006.01)
(Continued)

(52) U.S. Cl.
CPC .............. *H01R 13/02* (2013.01); *G01F 23/38* (2013.01); *H01R 13/52* (2013.01); *H01R 13/521* (2013.01);
(Continued)

(58) Field of Classification Search
CPC .............. H01R 43/24; H01R 13/5845; H01R 13/5205; H01R 13/5216; H01R 13/405; H01R 13/504

USPC ........................................ 439/604–606, 736
See application file for complete search history.

(56) References Cited

U.S. PATENT DOCUMENTS 4,461,925 A * 7/1984 Bowsky .............. H01B 17/305
                                                174/152 GM
4,847,528 A * 7/1989 Eguchi .................... B29C 70/84
                                                264/135
(Continued)

FOREIGN PATENT DOCUMENTS

JP    H4-324323 A    11/1992
JP    H8-115761 A    5/1996
(Continued)

OTHER PUBLICATIONS

U.S. Appl. No. 14/424,457, filed Feb. 27, 2015, Kawashima.
(Continued)

*Primary Examiner* — Hien Vu
(74) *Attorney, Agent, or Firm* — Posz Law Group, PLC

(57) ABSTRACT

A method for manufacturing a terminal includes: an electrically conductive member that has an electrical connection, which is formed at an end portion of the electrically conductive member; and a seal film that is formed on a surface of a intermediate portion of the electrically conductive member, which is other than the electrical connection. In the method for manufacturing, the electrically conductive member is formed by processing an end portion of a rounded rod, which has a cross section having an arcuate shape, into a planar shape to form the electrical connection. Furthermore, a liquid seal agent is coated on an intermediate portion of the rounded rod, which is other than the end portion. Then, the coated liquid seal agent is solidified to form the seal film.

7 Claims, 9 Drawing Sheets

(51) Int. Cl.
*G01F 23/38* (2006.01)
*H01R 43/00* (2006.01)
*H01R 43/16* (2006.01)
*H01R 13/52* (2006.01)

(52) U.S. Cl.
CPC ............ *H01R 43/005* (2013.01); *H01R 43/16* (2013.01); *Y10T 29/49208* (2015.01); *Y10T 29/49224* (2015.01)

(56) References Cited

U.S. PATENT DOCUMENTS

| | | | | |
|---|---|---|---|---|
| 4,976,634 | A | * | 12/1990 | Green .................. H01R 13/504 439/589 |
| 5,964,622 | A | * | 10/1999 | Ishikawa ............. B29C 45/1671 439/606 |
| 2005/0247124 | A1 | | 11/2005 | Fukuhara et al. |

FOREIGN PATENT DOCUMENTS

| | | |
|---|---|---|
| JP | 2003-234144 A | 8/2003 |
| JP | 2007-220484 A | 8/2007 |
| WO | 2014/087575 A1 | 6/2014 |

OTHER PUBLICATIONS

International Search Report of the International Searching Authority dated Feb. 10, 2014 issued in the corresponding International application No. PCT/JP2013/006509 (and English translation).

International Search Report and Written Opinion of the International Searching Authority dated Feb. 10, 2014 issued in the corresponding International application No. PCT/JP2013/006509 (and English translation).

* cited by examiner

METHOD FOR MANUFACTURING TERMINAL, AND TERMINAL

CROSS REFERENCE TO RELATED APPLICATIONS

This application is the U.S. national phase of International Application No. PCT/JP2013/006509 filed on Nov. 5, 2013 and is based on and incorporates herein by reference Japanese Patent Application No. 2012-256972 filed on Nov. 23, 2012 and Japanese Patent Application No. 2013-125968 filed on Jun. 14, 2013.

TECHNICAL FIELD

The present disclosure relates to a terminal, to which an external electrical conductor, such as a lead wire, is connected, and a method for manufacturing the terminal.

BACKGROUND ART

The Patent Literature 1 discloses a terminal, which is arranged to extend from an inside to an outside of a housing made of a resin material in a liquid level sensing apparatus placed in a fuel tank. A seal film is formed in a portion of the terminal, which contacts the housing, to limit intrusion of the fuel into the inside of the housing through a gap between the terminal and the housing. Specifically, a liquid seal agent is coated on a surface of the terminal, and this coated liquid seal agent is solidified to form the seal film.

As shown in FIG. 17, the cross section of this type of terminal 91 is often configured into a rectangular form. One reason for this configuration is that an electrical connection of an external terminal or lead wire (external electrical conductor) to an end portion of the terminal 91 can be easily made. Specifically, when the end portion is configured into a planar plate form, the end portion can be easily, plastically deformed to crimp the lead wire onto the end portion. Alternately, the end portion can be easily electrically connected to the external terminal by welding or soldering. Also, it is easy to implement a structure for electrically connecting the end portion to the external terminal by forming the end portion as a male contact and the external terminal as a female contact.

However, it is found that when a seal film 92 is formed on the terminal 91, which has the rectangular cross section, the following disadvantage may occur. Specifically, in a surface of the terminal 91, at each of four edge lines (edges 91a), which are located at four corners, respectively, of a rectangular cross section of the terminal 91 and extend in a longitudinal direction of the terminal 91 (a direction perpendicular to the plane of FIG. 17), a film thickness of the seal film 92 is thinned due to a surface tension of the liquid seal agent at the time of coating the liquid seal agent on the terminal 91. When the thin portion, which has the thin film thickness, is formed in the seal film 92, a sufficient sealing performance cannot be achieved.

Particularly, a selectable material of the liquid seal agent is limited to, for example, a material that is not deteriorated even upon exposure to the fuel, and thereby a material, which has a large viscosity, cannot be selected as the material of the liquid seal agent. In such a case, the thinning of the film thickness of the seal film 92 on the edge 91a becomes particularly prominent.

CITATION LIST

Patent Literature

PATENT LITERATURE 1: JPH04-324323A

SUMMARY OF THE INVENTION

The present disclosure is made in view of the above disadvantage, and it is an objective of the present disclosure to provide a method for manufacturing a terminal or the terminal, which alleviates thinning of a seal film while allowing easy electrical connection of the terminal with an external electrical conductor.

To achieve the above objective, according to the present disclosure, there is provided a method for manufacturing a terminal that includes: an electrically conductive member that has an electrical connection, which is formed at an end portion of the electrically conductive member, wherein the electrical connection is connectable with an external electrical conductor; and a seal film that is formed in a surface of a predetermined portion of the electrically conductive member, which is other than the electrical connection. In the method for manufacturing, the electrically conductive member is formed by processing an end portion of a rounded rod, which has a cross section having an arcuate shape, into a planar shape to form the electrical connection of the electrically conductive member while making a corresponding portion of the rounded rod, which is other than the end portion of the rounded rod, as the predetermined portion of the electrically conductive member. Thereafter, a liquid seal agent is coated on the predetermined portion. Then, the liquid seal agent, which is coated on the predetermined portion, is solidified to form the seal film.

Furthermore, to achieve the above objective, according to the present disclosure, there is provided a terminal that includes: an electrically conductive member that has an electrical connection, which is formed at an end portion of the electrically conductive member, wherein the electrical connection is connectable with an external electrical conductor; and a seal film that is formed in a surface of a predetermined portion of the electrically conductive member, which is other than the electrical connection. The electrical connection has a cross section having a planar shape, and the predetermined portion has a cross section having an arcuate shape.

DESCRIPTION OF EMBODIMENTS

Hereinafter, a terminal and a method for manufacturing the terminal of the respective embodiments of the present disclosure will be described with reference to the drawings.

First Embodiment

Figure 1:
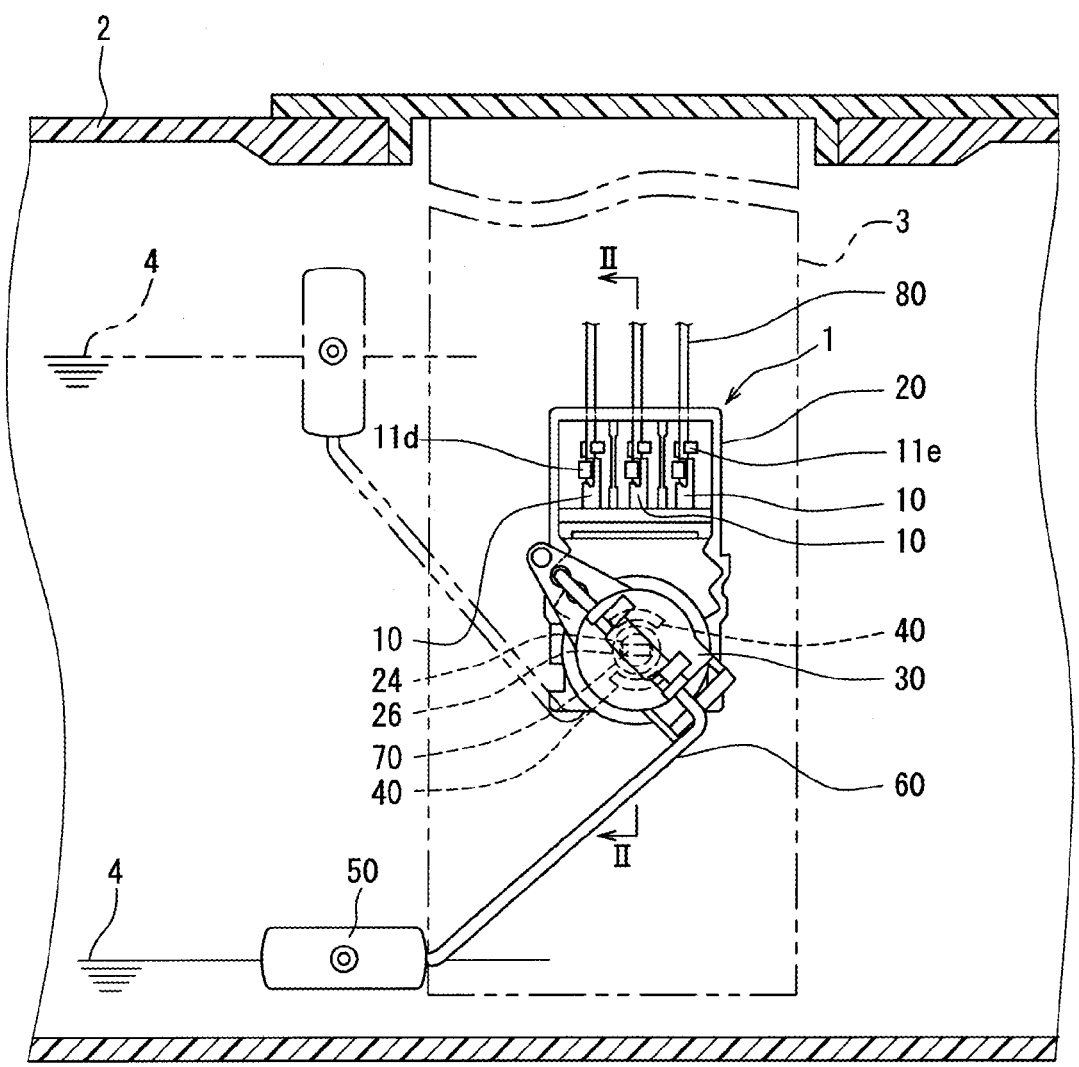
FIG. 1 is a front view of a liquid level sensing apparatus having terminals according to a first embodiment of the present disclosure.

As shown in FIG. 1, terminals 10 of the present embodiment are used in a liquid level sensing apparatus 1.
(Structure of Liquid Level Sensing Apparatus)

First of all, a structure of the liquid level sensing apparatus 1 will be described in detail.

The liquid level sensing apparatus 1 is received in a fuel tank 2, which stores liquid fuel in a vehicle. The liquid level sensing apparatus 1 is supported, for example, by a fuel pump module 3 at a position, at which the liquid level sensing apparatus 1 is immersed in the fuel in the fuel tank 2. In this supported state, the liquid level sensing apparatus 1 senses a level of a surface 4 of the fuel in the fuel tank 2.

Figure 2:
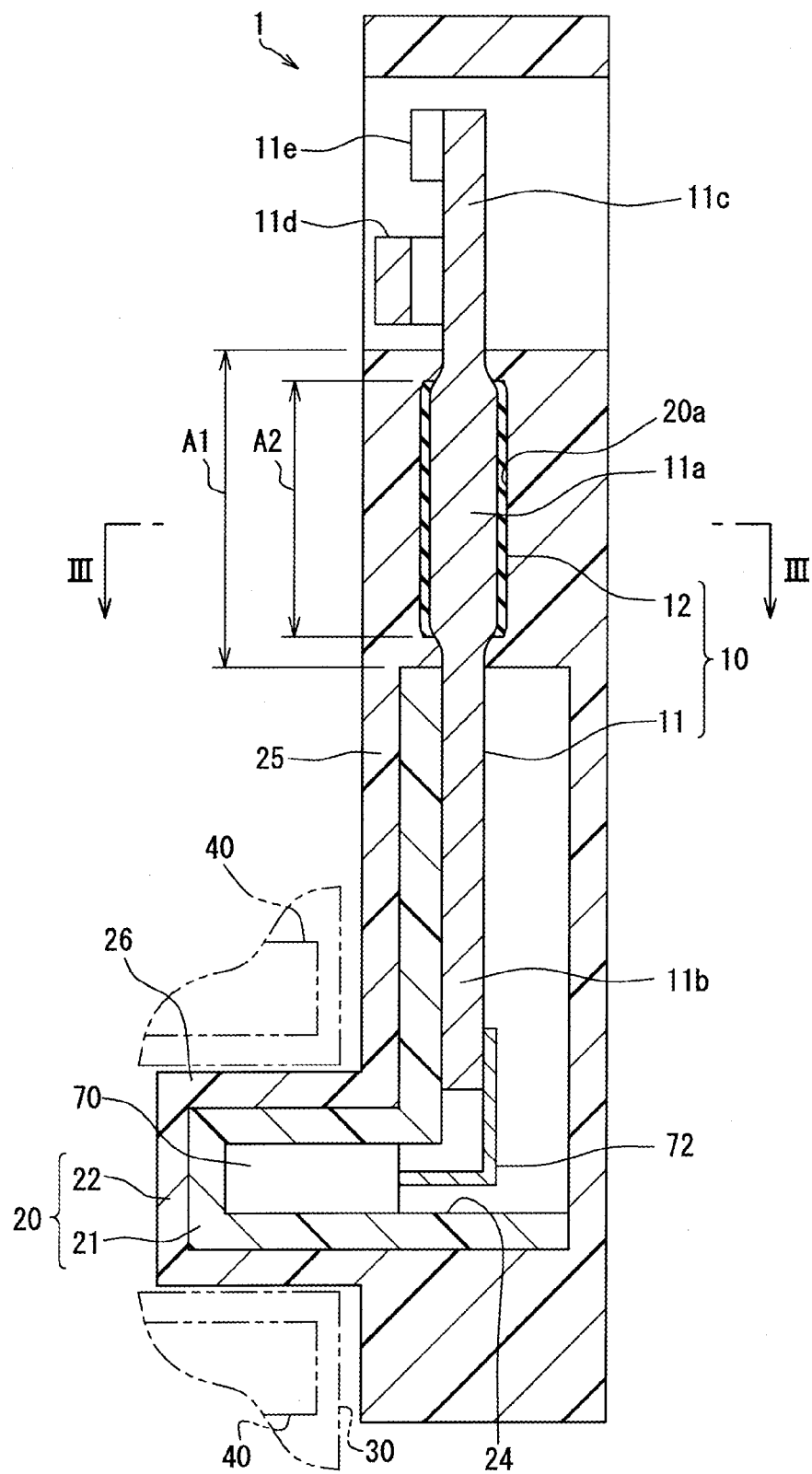
FIG. 2 is a cross-sectional view taken along line II-II in FIG. 1.

As indicated in FIGS. 1 and 2, the liquid level sensing apparatus 1 includes a housing 20, a plurality of terminals 10, a magnet holder 30, a plurality of magnets 40, a float 50, a float arm 60 and a Hall IC 70.

As shown in FIG. 2, the housing 20 includes an inner case 21 and an outer case 22. The inner case 21 is made of a resin material, such as polyphenylene sulfide resin. The inner case 21 includes a hollow receiving chamber 24. The outer case 22 is made of a resin material, such as polyphenylene sulfide resin. The outer case 22 surrounds the inner case 21, which is embedded in an inside of the outer case 22. The outer case 22 includes a base portion 25 and a bearing portion 26. The base portion 25 extends in a form of a thick plate. The bearing portion 26 projects in a form of a boss from the base portion 25.

The multiple terminals 10 are arranged to extend from an inside (the receiving chamber 24) of the housing 20 to an outside of the housing 20 (see FIG. 1). Each terminal 10 is formed by forming a seal film 12 on an electrically conductive member 11. One end portion 11b of the terminal 10 (the electrically conductive member 11), which is located at one end of the terminal 10 in a longitudinal direction, projects in the receiving chamber 24, and the other end portion 11c of the terminal 10, which is located at the other end of the terminal 10 in the longitudinal direction, is exposed to an outside of the base portion 25. An intermediate portion (a predetermined portion) 11a of the electrically conductive member 11, which is located between the one end portion 11b and the other end portion 11c, is embedded in the inside of the base portion 25.

The seal film 12 seals between the electrically conductive member 11 and the base portion 25. Specifically, the seal film 12 is formed such that even when the base portion 25 is shrunk in a direction away from the electrically conductive member 11 due to deterioration over time, the seal film 12 maintains the sealing between the electrically conductive member 11 and the base portion 25 in a manner that limits formation of a gap between the electrically conductive member 11 and the base portion 25. Specifically, the seal film 12, which has been elastically deformed in a compressing direction of the seal film 12, is expanded to follow the shrinking of the base portion 25, so that the seal film 12 seals the gap discussed above. In this way, conduction of the fuel into the inside of the housing 20 along the terminal 10 is limited.

Thereby, the material of the seal film 12 needs to be elastically deformable to an extent that allows the seal film 12 to follow the shrinking of the base portion 25, and the material of the seal film 12 also needs to have oil resistance for limiting deterioration caused by the fuel. A specific example of the material of the seal film 12 is a rubber material, such as epichlorhydrin rubber, fluororubber, or nitrile rubber. The material of the electrically conductive member 11 is required to have the oil resistance for limiting the deterioration caused by the fuel as well as the electric conductivity. A specific example of the material of the electrically conductive member 11 is a metal material, such as bronze (e.g., phosphor bronze) or brass.

Figure 3:
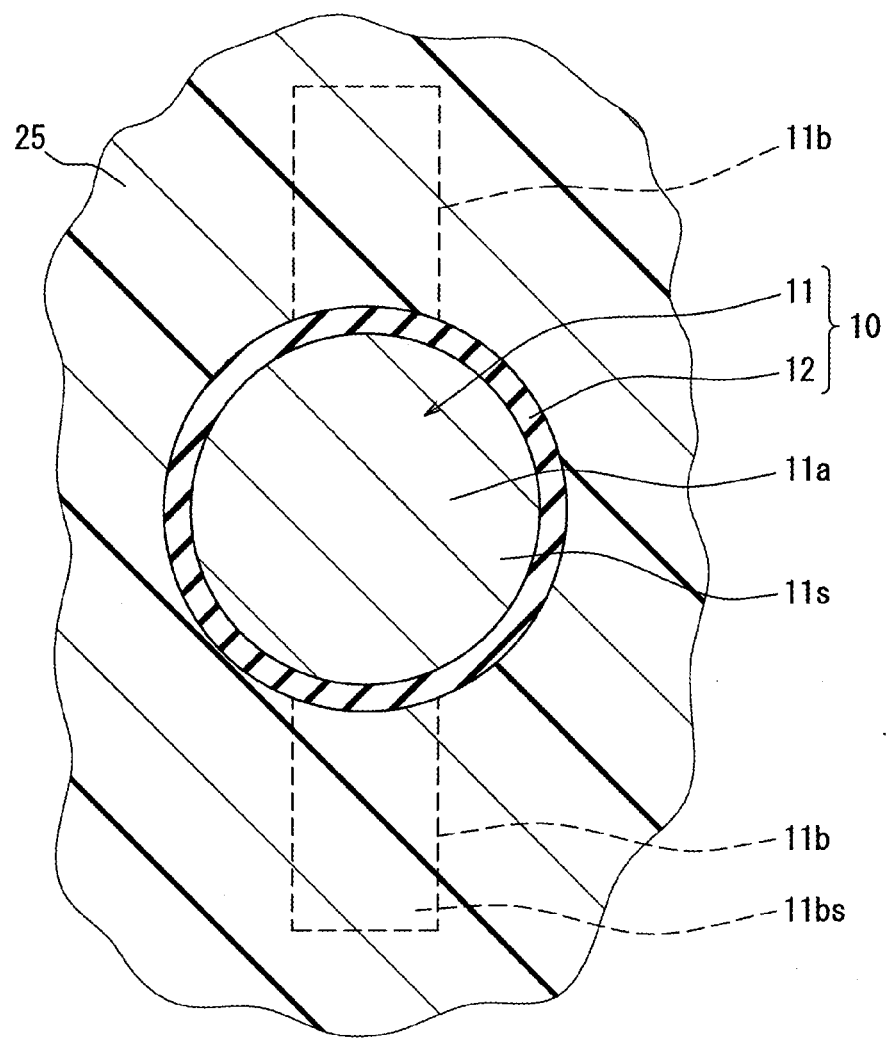
FIG. 3 is an enlarged cross-sectional view taken along line III-III in FIG. 2.
Figure 8:
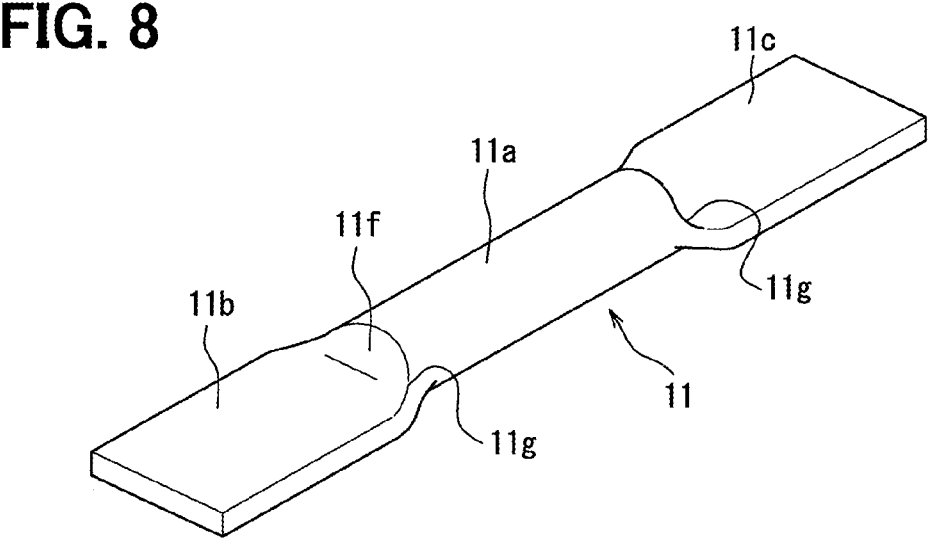
FIG. 8 is a perspective view showing an electrically conductive member formed at the press step of the first embodiment shown in FIG. 7.

As shown in FIGS. 3 and 8, a cross section 11s of the intermediate portion 11a, which is taken in a direction perpendicular to a longitudinal direction of the electrically conductive member 11, is configured into a circular shape (arcuate shape). A cross section 11bs of the one end portion 11b and a cross section 11cs of the other end portion 11c, each of which is taken in the direction perpendicular to the longitudinal direction, are configured into a rectangular shape (a planar shape) that has four right angle corners. In these cross sections 11s, 11bs, 11cs, a center of the intermediate portion 11a coincides with a center of each end portion 11b, 11c. A cross section of each of connecting portions 11f of the terminal 10, each of which connects between a corresponding one of the one end portion 11b and the other end portion 11c to the intermediate portion 11a, is configured such that the cross section of the connecting portion 11f progressively changes from the circular shape to the rectangular shape. Each connecting portion 11f has obtuse angle parts 11g, which are connected to edges of a corresponding one of the one end portion 11b and the other end portion 11c.

The seal film 12 is configured to extend like a ring along the surface of the intermediate portion 11a. With reference to FIG. 2, it is now assumed that in a longitudinal direction of the terminal 10 (a top-to-bottom direction in FIG. 2), a range of a part of the base portion 25, through which the terminal 10 extends, is referred to as a range A1, and a range of the intermediate portion 11a is referred to as a range A2. In such a case, the terminal 10 is arranged such that the range A2 is placed within the range A1. In other words, the range A2 of the seal film 12 is included in the range A1.

A corresponding one of terminals 72 of the Hall IC 70 is electrically connected to a planar surface of the one end portion 11b by welding or soldering. A lead wire 80 is electrically connected to a planar surface of the other end portion 11c by crimping. Specifically, as shown in FIGS. 1 and 2, a crimp contact part 11d and a securing part 11e are formed in the other end portion 11c. An electrically conductive portion of the lead wire 80 is clamped between the crimp contact part 11d and the other end portion 11c and is thereby crimped. In this way, the lead wire 80 and the terminal 10 are electrically connected with each other.

A sheath of the lead wire 80, which covers the electrically conductive portion of the lead wire 80, is clamped between the securing part 11e and other end portion 11c and is thereby securely held. There are three lead wires 80, which include a signal line for outputting a measurement signal of the Hall IC 70, a power sully line for supplying an electric power to the Hall IC 70, and a ground line. The terminals 72 of the Hall IC 70 and the lead wires 80 serve as external electrical conductors, and the one end portion 11b and the other end portion 11c serve as electrical connections.

With reference to FIGS. 1 and 2, the magnet holder 30 is made of a resin material, such as polyacetal resin. The magnet holder 30 is rotatably supported by the bearing portion 26. There is formed a pair of magnets 40 from a ferromagnetic material, such as ferrite magnet. Each magnet 40 is embedded in the magnet holder 30 to enable integral rotation of the magnet 40 with the magnet holder 30.

With reference to FIG. 1, the float 50 is made of a light weight material, such as porous ebonite, so that the float 50 has a relative density, which is smaller than that of the fuel. The float 50 can float on the surface 4 of the fuel in the fuel tank 2. The float arm 60 is made of a metal material, such as stainless steel, and is configured into a wire rod form. The float arm 60 connects between the float 50 and the magnet holder 30. With this connection, the magnet holder 30 is rotated relative to the housing 20 in response to upward or downward movement of the float 50, which floats on the surface 4.

As shown in FIGS. 1 and 2, the Hall IC 70 is a magnetic sensing element that senses a magnetic field and generates a signal, which corresponds to the sensed magnetic field. The Hall IC 70 is received in the receiving chamber 24, so that the Hall IC 70 is held between the pair of magnets 40. As shown in FIG. 1, the Hall IC 70 has the multiple terminals 72, which are connected to the terminals 10, respectively. In an energized state of the Hall IC 70, which is powered from the outside, the Hall IC 70 senses the magnetic field generated between the magnets 40, and thereby the Hall IC 70 outputs the generated signal to the outside of the fuel tank 2 through the predetermined terminal 72, the predetermined terminal 10 and the predetermined lead wire 80. The magnetic field, which is sensed with the Hall IC 70, changes in response to the relative rotational angle of the magnet holder 30 relative to the housing 20, i.e., changes in response to the upward or downward movement of the float 50. Thus, the level of the surface 4 of the fuel, on which the float 50 floats, can be sensed based on the output signal from the Hall IC 70.

(Method for Manufacturing Terminal)

Next, a method for manufacturing the terminals 10 used in the liquid level sensing apparatus 1 will be described according to a manufacturing flow of FIG. 4 with reference to FIGS. 5 to 9. A top-to-bottom direction of FIGS. 5 to 9 substantially coincides with the vertical direction of the manufacturing environment.

Figure 4:
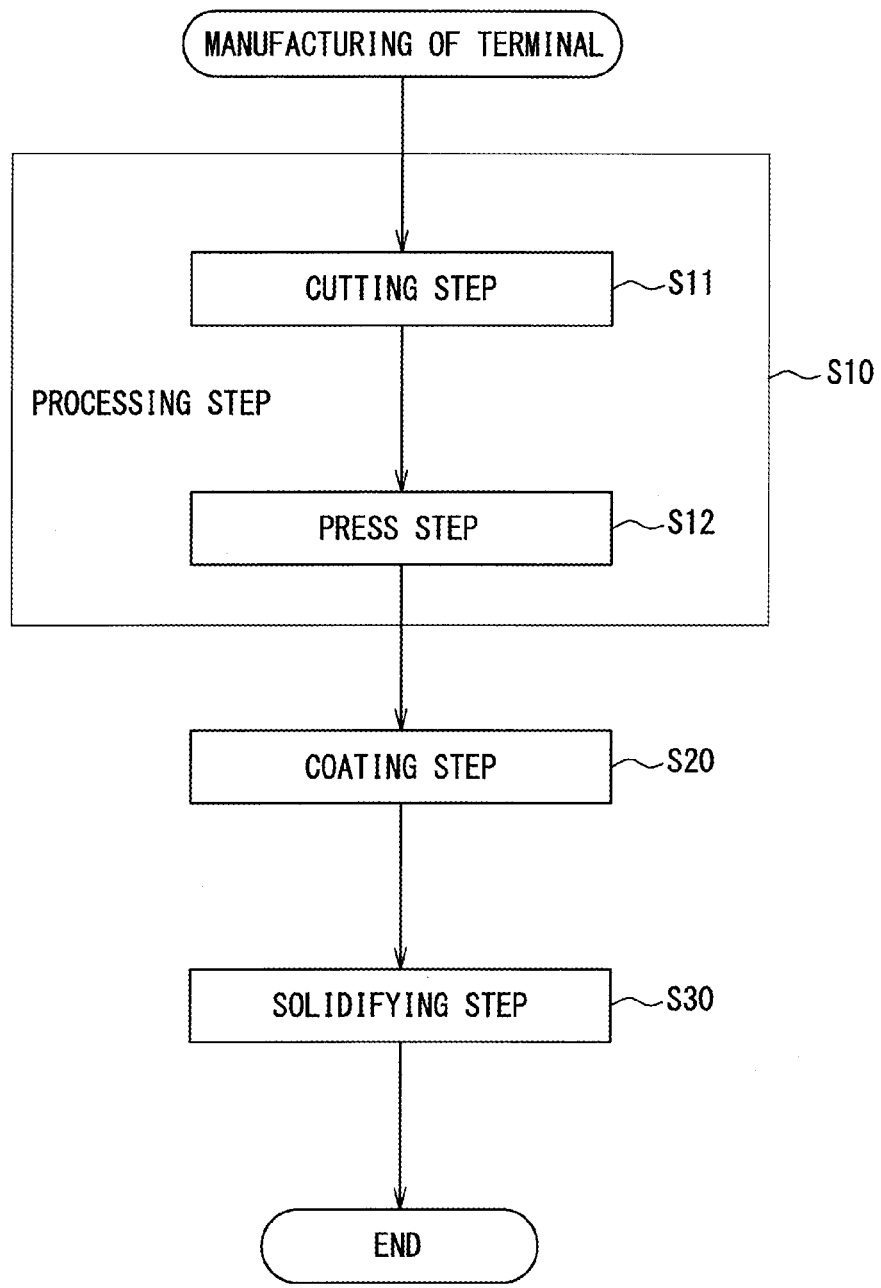
FIG. 4 is a flowchart showing a manufacturing procedure of the terminals of the first embodiment of the present disclosure shown in FIGS. 2 and 3.
Figure 5:
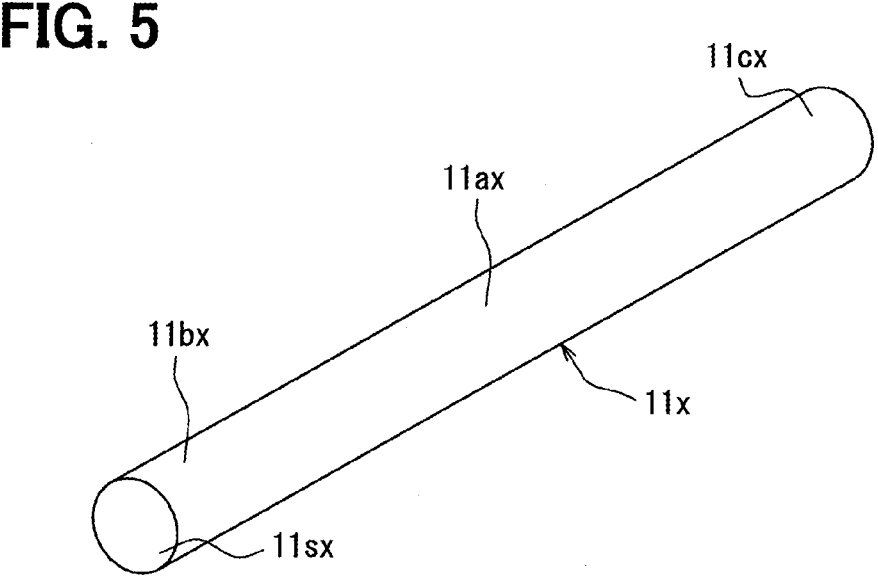
FIG. 5 is a perspective view showing a rounded rod after a cutting step of the first embodiment shown in FIG. 4.

In the manufacturing flow shown in FIG. 4, first of all, the one end portion 11b and the other end portion 11c (the electrical connections) are formed at a processing step S10. The processing step S10 is divided into a cutting step S11 and a press step S12. At the cutting step S11, as shown in FIG. 5, a rounded rod 11x, which has a cross section 11sx having a circular shape, is cut to have a length that coincides with a length of the terminal 10.

Figure 6:
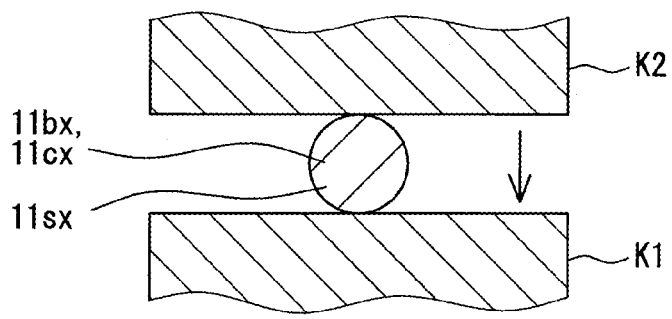
FIG. 6 is a cross-sectional view of the rounded rod before execution of a press step of the first embodiment shown in FIG. 4.
Figure 7:
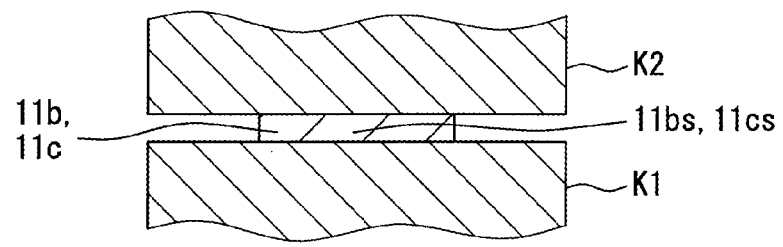
FIG. 7 is a cross-sectional view showing a state after press working of the rounded rod at the press step of the first embodiment shown in FIG. 4.

Next, at the press step S12, as shown in FIG. 6, the end portions 11bx, 11cx of the rounded rod 11x after the cutting of the rounded rod 11x are set between a lower die K1 and an upper die K2 of a press machine. Then, as shown in FIG. 7, the press working is performed such that a cross section of each end portion 11bx, 11cx is deformed into a rectangular shape. The cross section 11sx of a center portion (a predetermined portion) 11ax of the rounded rod 11x, which is an intermediate portion of the rounded rod 11x after the cutting, is kept as the circular shape since the press working is not performed on the center portion 11ax. That is, the center portion 11ax of the rounded rod 11x after the cutting is a portion (a corresponding portion) that corresponds to the intermediate portion 11a of the electrically conductive member 11. When the press step is performed, the manufacturing of the electrically conductive member 11 shown in FIG. 8 is completed. Specifically, the electrical connection, which has the rectangular cross section 11bs, 11cs, is formed in each of the one end portion 11b and the other end portion 11c of the electrically conductive member 11, and the cross section 11s of the intermediate portion 11a has the circular shape.

Figure 9:
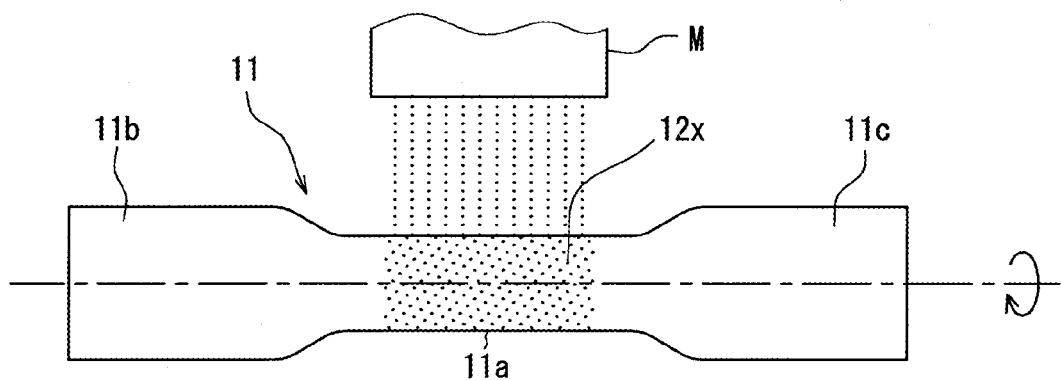
FIG. 9 is a front view of a dispenser and the electrically conductive member, showing an execution state of a coating step of the first embodiment shown in FIG. 4.

Next, at a coating step S20, as shown in FIG. 9, a liquid seal agent 12x, which is supplied from an outlet of a dispenser M (a liquid metering and outputting device), is coated on the intermediate portion 11a. The liquid seal agent 12x is formed by diluting an unvulcanized rubber material, such as epichlorhydrin rubber, fluororubber, or nitrile rubber, with a solvent, such as toluene. Furthermore, at the coating step S20, the electrically conductive member 11 is placed such that a central axis of the electrically conductive member 11 (see a dot-dash line in FIG. 9) coincides with the horizontal direction, and the electrically conductive member 11 is rotated about the central axis thereof while the central axis of the electrically conductive member 11 is kept to coincide with the horizontal direction. Specifically, the liquid seal agent 12x is coated on the intermediate portion 11a while the electrically conductive member 11 is rotated.

Next, at a solidifying step S30, the liquid seal agent 12x, which is coated on the intermediate portion 11a, is solidified. Specifically, the liquid seal agent 12x may be naturally dried under the normal temperature or may be forcefully dried with application of heat. In this way, the solvent of the liquid seal agent 12x is evaporated, so that the liquid seal agent 12x is solidified. Furthermore, at the solidifying step S30, the electrically conductive member 11, which is coated with the liquid seal agent 12x, is placed in a heating furnace (not shown) and is baked in a baking step. For example, the baking step may be performed by heating the electrically conductive member 11 for about thirty minutes under the temperature of 150 degrees Celsius. In this way, the rubber material in the liquid seal agent 12x is cross-linked, and thereby the liquid seal agent 12x is solidified to form the seal film 12, as shown in FIGS. 2 and 3.

Through the above-described manufacturing flow, each of the cross sections 11bs, 11cs of the electrical connections, i.e., the end portions 11b, 11c of the electrically conductive member 11 has the rectangular shape, and the cross section of the intermediate portion 11a of the electrically conductive member 11 is configured into the circular shape. Furthermore, the seal film 12 is formed in the intermediate portion 11a of the electrically conductive member 11. In this way, the manufacturing of the terminals 10 is completed. In FIGS. 4 to 9, the crimp contact part 11d and the securing part 11e are not depicted for the sake of simplicity. Here, it should be noted that the crimp contact part 11d and the securing part 11e may be formed in the processing step S10. Specifically, after the achievement of the state shown in FIG. 8 through the press step S12, the press working is performed on the end portion 11c to cut the end portion 11c in a form, which corresponds to the crimp contact part 11d and the securing part 11e. Thereafter, the cut part of the end portion 11c, which is cut in the form corresponding to the crimp contact part 11d and the securing part 11e, is bent into the form shown in FIGS. 1 and 2 to form the crimp contact part 11d and the securing part 11e.

The terminals 10, which are manufactured in the above-described manner, are placed in a resin molding die, which is used for the resin molding of the base portion 25, and the terminals 10 are insert molded integrally with the base portion 25. Due to the pressure of the molten resin in the molding die at the time of resin molding, the seal film 12 of each terminal 10 is compressed and is elastically deformed. Thereby, each terminal 10 is embedded in the base portion 25 (more specifically, in a corresponding through-hole 20a of the base portion 25) in the state where the seal film 12 of the terminal 10 is elastically deformed. Thus, even when the base portion 25 is shrunk by the heat or is shrunk due to deterioration of the base portion 25 over time, the seal film 12 is expanded to follow the shrinking of the base portion 25. Thereby, the seal film 12 can perform its seal function in such a manner that the seal film 12 limits formation of a gap between the terminal 10 and the base portion 25.

Figure 17:
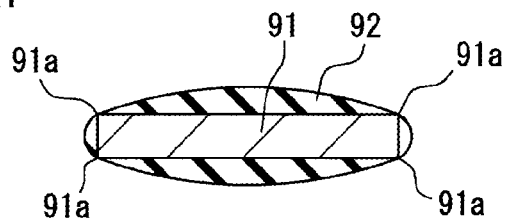
FIG. 17 is a cross-sectional view of a prior art terminal.

As discussed above, according to the present embodiment, the two end portions of the rounded rod 11x are processed through the press working to form the electrically conductive member 11. Therefore, the intermediate portion 11a of the electrically conductive member 11, which is coated with the liquid seal agent 12x, has the cross section 11s that is configured into the circular shape. Thereby, the edges 91a, which are exemplified in FIG. 17, are absent in the intermediate portion 11a of the electrically conductive member 11, which is coated with the liquid seal agent 12x. Thus, it is possible to eliminate the thinning of the film thickness of the seal film 12, which is caused by the surface tension of the liquid seal agent 12x at the time of performing the coating step S20.

Furthermore, the end portions 11b, 11c, which serve as the electrical connections, are processed such that the cross section 11bs, 11cs of each of the end portions 11b, 11c has the rectangular shape. Therefore, at the time of electrically connecting the terminal 72 of the Hall IC 70 to the one end portion 11b by the welding or the soldering, the connecting operation efficiency can be improved. Furthermore, the process of forming of the crimp contact part 11d and the securing part 11e can be easily implemented before the time of electrically connecting the lead wire 80 to the other end portion 11b by the crimping. Thereby, the electrical connection by the crimping discussed above can be easily achieved.

Furthermore, the present embodiment, which has the following characteristics, can achieve the following advantages due to the following characteristics.

(1) If the coating step S20 is performed before the execution of the processing step S10 unlike the present embodiment, the seal film 12 may possibly contact the press machine to cause a damage of the seal film 12 in the middle of the processing step S10. In contrast, according to the present embodiment, the coating step S20 is performed after the execution of the processing step S10. Therefore, the above possibility of damaging the seal film 12 can be reduced.

(2) The coating step S20 is characterized by that the liquid seal agent 12x is coated on the intermediate portion (the predetermined portion) 11a while the rounded rod 11x (more precisely, the electrically conductive member 11 after the execution of the press working on the rounded rod 11x) is rotated about the central axis. Since the cross section 11s of the intermediate portion 11a is configured into the circular shape, a distance between the surface of the intermediate portion 11a and the outlet of the dispenser M does not change even when the intermediate portion 11a is rotated in a manner discussed above. Therefore, the uniform coating of the liquid seal agent 12x on the intermediate portion 11a can be promoted.

(3) Here, if the end portions 11b, 11c are formed into the planar shape through a cutting operation with a lath unlike the present embodiment, a surface roughness of the end portions 11b, 11c is increased. Then, a contact surface area between the lead wire 80 and the other end portion 11b, which contact with each other through the crimping, is reduced to possibly cause electrical conduction failure. In contrast, according to the present embodiment, at the processing step S10, the end portions 11b, 11c are formed into the planar shape through the press working. Therefore, the surface roughness of the end portions 11b, 11c can be reduced to increase the contact surface area between each of the external electrical conductors and the corresponding one of the end portions 11b, 11c. Thus, the possibility of the electrical conduction failure can be reduced.

(4) The terminals 10 of the present embodiment are characterized by that each terminal 10 extends from the inside of the housing 20, which is placed in the environment exposed to the liquid fuel, to the outside of the housing 20, and the seal film 12 seals between the housing 20 and the electrically conducting member 11 of the terminal 10.

In the case where the terminal 10 is exposed to the fuel, the material of the liquid seal agent 12x is required to have the oil resistance for withstanding the property modification of the material by the fuel. However, the material, which can satisfy such a requirement and has realistic costs, is limited to ones that have low viscosities. In the case where the liquid seal agent 12x, which has the low viscosity, is used, when the edges 91a, which are exemplified in FIG. 17, are present, the film thickness of the seal film 92 is disadvantageously thinned, as discussed above. Thus, when the intermediate portion 11a, which has the cross section 11s having the circular shape, is formed in the terminal 10, which is used in the environment exposed to the fuel, the above discussed objective can be appropriately achieved.

Second Embodiment

In the first embodiment, the seal film 12 is formed in the intermediate portion 11a and is not formed in the the connecting portions 11f. In contrast, according to the present embodiment, the seal film 12 is also formed in each connecting portion 11f in addition to the intermediate portion 11a.

As discussed above, the cross section 11s of the intermediate portion 11a is the circular shape, and the cross sections 11bs, 11cs of the one end portion 11b and the other end portion 11c are rectangular shapes, respectively. The cross section of each of the connecting portions 11f, each of which connects between the corresponding one of the one end portion 11b and the other end portion 11c to the intermediate portion 11a, is configured such that the shape of the cross section of the connecting portion 11f progressively changes from the shape of the cross section of the corresponding one of the one end portion 11b and the other end portion 11c to the shape of the cross section of the intermediate portion 11a. Therefore, the surface of the connecting portion 11f is configured into a tilted form that is tiled to extend from the surface of the corresponding one of the one end portion 11b and the other end portion 11c to the surface of the intermediate portion 11a.

Figure 10:
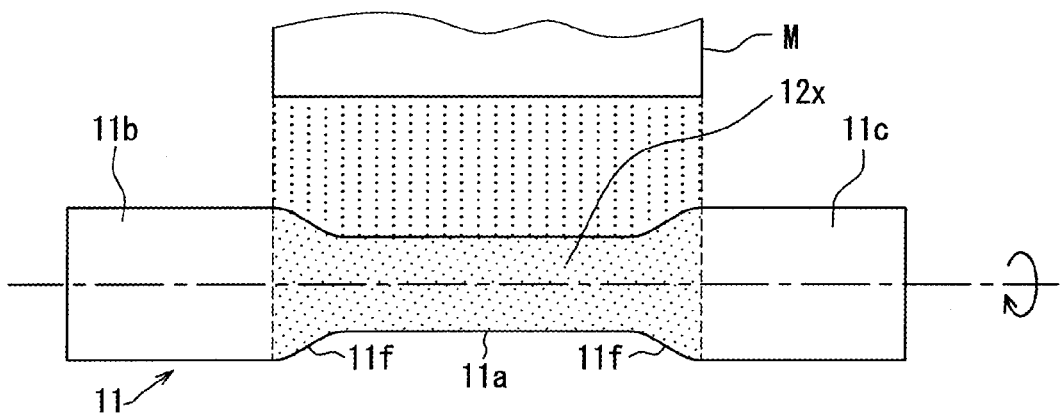
FIG. 10 is a front view of the dispenser and the electrically conductive member, showing an execution state of a coating step of a second embodiment of the present disclosure.
Figure 11:
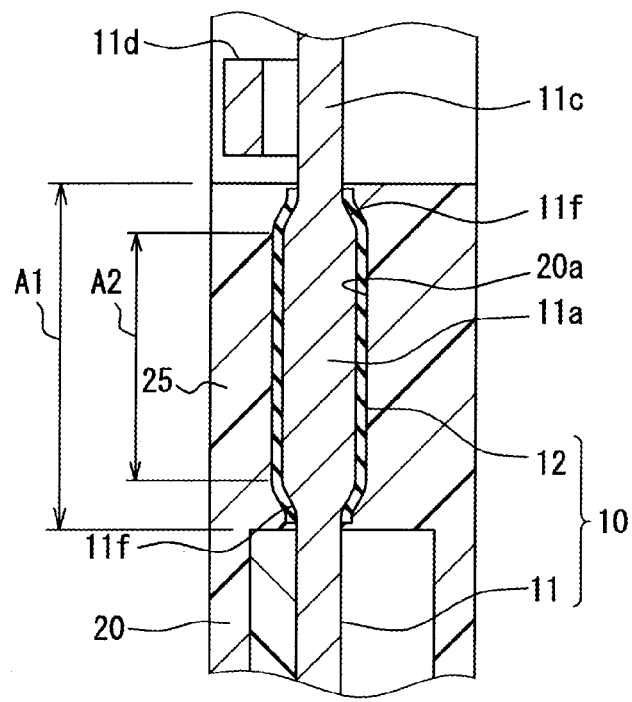
FIG. 11 is a cross-sectional view of a liquid level sensing apparatus according to the second embodiment.

At the coating step of the present embodiment, as shown in FIG. 10, the liquid seal agent 12x, which is supplied from the outlet of the dispenser M, is also coated on the connecting portions 11f together with the intermediate portion 11a. Thereafter, the solidifying step is performed, so that as shown in FIG. 11, the seal film 12 is formed in the intermediate portion 11a and the connecting portions 11f.

The terminals 10, which are manufactured in the above described manner, are insert molded integrally with the base portion 25, like in the first embodiment. Therefore, each terminal 10 is placed in the corresponding through-hole 20a of the base portion 25 to extend from the inside of the housing 20 to the outside of the housing 20. Specifically, the intermediate portion 11a and the connecting portions 11f are entirely placed in the through-hole 20a. The intermediate portion 11a and the connecting portions 11f are embedded in the base portion 25 in the state where the seal film 12, which is formed on the intermediate portion 11a and the connecting portions 11f, is compressed and elastically deformed.

Specifically, in the present embodiment, the insert molding discussed above is performed to place each terminal 10 in the corresponding through-hole 20a of the housing 20 after the execution of the solidifying step and to seal between the intermediate portion (the predetermined portion) 11a and the housing 20 with the seal film 12. This insert molding serves as a placing step.

Accordingly, in the present embodiment, the connecting portions 11f and the intermediate portion (the predetermined portion) 11a are placed in the corresponding through-hole 20a at the placing step. Thereby, even when a removing force for removing the terminal 10 from the through-hole 20a is applied to the terminal 10, the connecting portion 11f is caught by the housing 20. As a result, the removal of the terminal 10 from the through-hole 20a becomes difficult.

Furthermore, according to the present embodiment, at the coating step, the liquid seal agent 12x is coated to the connecting portions 11f in addition to the intermediate portion (the predetermined portion) 11a. Thereby, the seal film 12 is formed in the intermediate portion 11a and the connecting portions 11f. Thus, a length of the seal film 12 is lengthened in an extending direction of the through-hole 20a. Thereby, the sealing performance of the seal film 12 can be improved, so that the possibility of intrusion of the fuel into the inside of the housing 20 through the gap between the terminal 10 and the housing 20 can be reduced.

Each connecting portion 11f has the obtuse angle parts 11g, which are connected to the edges of the corresponding one of the one end portion 11b and the other end portion 11c. Each edge 91a, which is exemplified in FIG. 17, has an angle of 90 degrees in the cross-sectional view. In contrast, each obtuse angle part 11g has an obtuse angle that is larger than 90 degrees. Thus, the thickness of the seal film 12, which is formed in the obtuse angle part 11g of the connecting portion 11f, becomes larger than the thickness of the seal film 12 formed in the edge 91a. Therefore, it can sufficiently contribute to an improvement of the sealing performance.

Other Embodiments

The present disclosure is not limited to the disclosure of the above embodiments, and the above embodiments may be modified as follows. Furthermore, the features of each embodiment may be freely combined with the features of the other embodiment(s).

Figure 12:
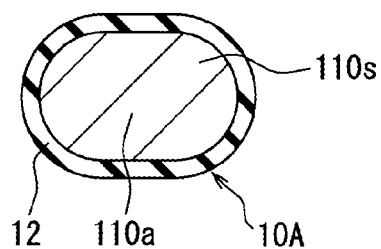
FIG. 12 is a cross-sectional view showing a first modification of the terminal.
Figure 13:
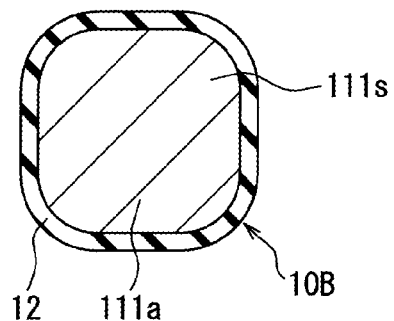
FIG. 13 is a cross-sectional view showing a second modification of the terminal.
Figure 14:
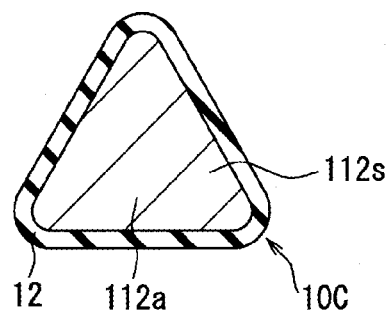
FIG. 14 is a cross-sectional view showing a third modification of the terminal.

(A) In the above embodiments, as shown in FIG. 3, the cross section 11s of the intermediate portion 11a is configured into the circular shape. However, the present disclosure is not limited to such a circular shape, and it may be only required that the intermediate portion 11a has the cross section in the arcuate shape (i.e., the cross section having the arcuate shape). The cross section in the arcuate shape refers to a cross section in a shape that does not have the edges 91a shown in FIG. 17, and the edge refers to an angled part having an angle of equal to or smaller than 90 degrees. Therefore, as indicated in, for example, a modification of FIG. 12, the cross section 110s of the intermediate portion (the predetermined portion) 110a of the electrically conductive member of the terminal 10A may be formed into an ellipse shape. Furthermore, as indicated in a modification of FIG. 13, the cross section 111s of the intermediate portion (the predetermined portion) 111a of the electrically conductive member of the terminal 10B may be formed into a shape that is produced by shaping each of corners of a rectangle into an arcuate shape. Furthermore, as indicated in a modification of FIG. 14, the cross section 112s of the intermediate portion (the predetermined portion) 112a of the electrically conductive member of the terminal 10C may be formed into a shape that is produced by shaping each of corners of a triangle into an arcuate shape.

(B) In the above embodiments, the end portions 11b, 11c are formed to have the cross section in the rectangular shape. However, the present disclosure is not limited to such a shape, and it may be only required that the end portion 11b, 11c has a planar shape. Here, the planar shape refers to a shape that has a planar surface to be electrically connected with the external electrical conductor, i.e., the terminal 72 or the lead wire 80. Therefore, as long as the end portion 11b, 11c has the planar surface, the cross section of the end portion 11b, 11c may have the shape of FIG. 3 having the edges at the corners, or may have a shape, in which a corner(s) is shaped into an arcuate shape.

(C) At the coating step of FIG. 9, the liquid seal agent 12x is dropped over the intermediate portion 11a. Alternatively, the liquid seal agent 12x may be received in a container, and the intermediate portion 11a may be immersed into the liquid seal agent 12x in the container to coat the intermediate portion 11a with the liquid seal agent 12x. Even in such a case, it is desirable that the intermediate portion 11a is immersed into the liquid seal agent 12x while the electrically conductive member 11 is rotated.

Figure 15:
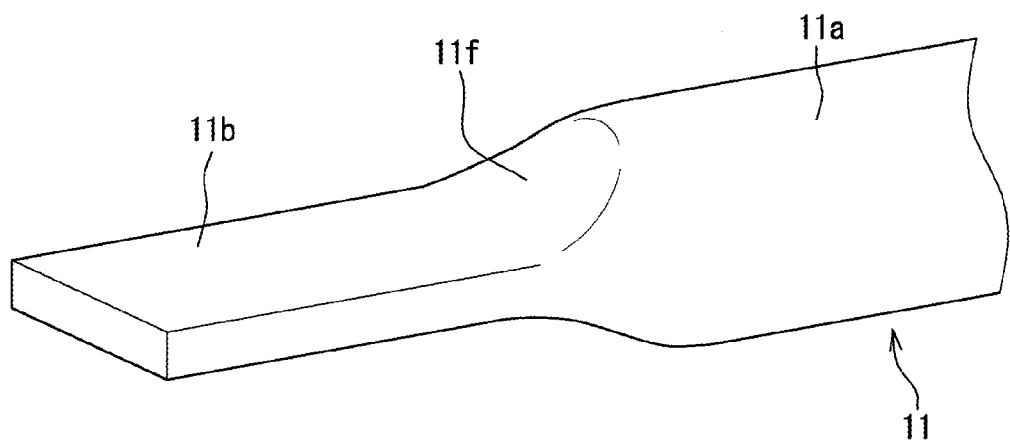
FIG. 15 is a partial perspective view showing a fourth modification of the terminal.

(D) Each of the connecting portions 11f of the second embodiment has the obtuse angle parts 11g, which are connected to the edges of the corresponding one of the one end portion 11b and the other end portion 11c. Alternatively, at the processing step S10, the one end portion 11b and the other end portion 11c may be formed such that the obtuse angle parts 11g shown in FIG. 8 are formed into a shape that is rounded as indicated in a modification of FIG. 15. For example, at the press step in the processing step S10, shapes of the dies and a press speed may be adjusted to have the shape shown in FIG. 15.

Figure 16:
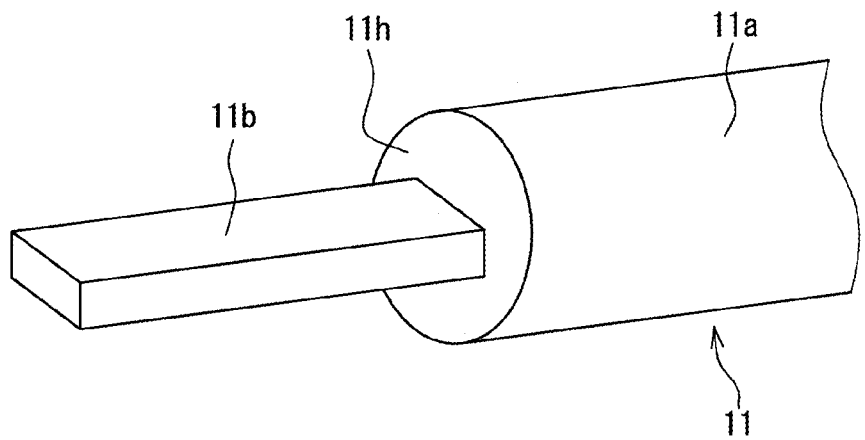
FIG. 16 is a partial perspective view showing a fifth modification of the terminal.

(E) Each of the connecting portions 11f of the second embodiment is formed to have the shape that changes from the shape of the cross section of the corresponding one of the one end portion 11b and the other end portion 11c to the shape of the cross section of the intermediate portion 11a, so that the surface of the connecting portion 11f has the tilted form. With respect to this feature, as indicated in a modification of FIG. 16, each connecting portion 11h may have a stepped shape, which changes in a stepwise manner from the shape of the cross section of the corresponding one of the one end portion 11b and the other end portion 11c to the shape of the cross section of the intermediate portion 11a. Even in such a case, each terminal 10 is insert molded such that the connecting portions 11h are placed in the through-hole 20a, and thereby the removal of the terminal 10 can be limited.

(F) In the second embodiment, the whole intermediate portion 11a and the whole connecting portions 11f, the part of the one end portion 11b and the part of the other end portion are insert molded. In such a case, the seal film 12 may be also formed in the part of the one end portion 11b and the part of the other end portion 11c, so that the seal film 12 is formed along the entire range A1 of the terminal 10, which extends through the base portion 25.

The invention claimed is:

1. A method for manufacturing a terminal that includes:
   an electrically conductive member that has an electrical connection, which is formed at an end portion of the electrically conductive member, wherein the electrical connection is connectable with an external electrical conductor; and
   a seal film that is formed on a surface of an intermediate portion of the electrically conductive member, which is other than the electrical connection, the method comprising:
   forming the electrically conductive member by processing an end portion of a rounded rod, which has a cross section having an arcuate shape, into a planar shape to form the electrical connection of the electrically conductive member while making a corresponding portion of the rounded rod, which is other than the end portion of the rounded rod, as the intermediate portion of the electrically conductive member;
   coating a liquid seal agent on the intermediate portion; and
   solidifying the liquid seal agent, which is coated on the intermediate portion, to form the seal film, wherein the coating of the liquid seal agent is executed after the forming of the electrically conductive member.

2. The method for manufacturing according to claim 1, wherein the coating of the liquid seal agent includes coating the liquid seal agent on the intermediate portion while the electrically conductive member is rotated about a central axis of the electrically conductive member.

3. The method for manufacturing according to claim 1, wherein the forming of the electrically conductive member includes processing the end portion of the rounded rod into the planar shape through press working.

4. The method for manufacturing according to claim 1, further comprising placing the terminal into a through-hole of a housing after the solidifying of the liquid seal agent, so that the seal film seals between the intermediate portion and the housing, wherein:
   the placing of the terminal includes placing a connecting portion of the terminal, which connects between the electrical connection and the intermediate portion, into the through-hole along with the intermediate portion.

5. The method for manufacturing according to claim 4, wherein the coating of the liquid seal agent includes coating the liquid seal agent on the connecting portion in addition to the intermediate portion.

6. A terminal comprising:
   an electrically conductive member that has an electrical connection, which is formed at an end portion of the electrically conductive member, wherein the electrical connection is connectable with an external electrical conductor; and
   a seal film that is formed on a surface of an intermediate portion of the electrically conductive member, which is other than the electrical connection, wherein:
   the electrical connection has a cross section having a planar shape, and the intermediate portion has a cross section having an arcuate shape;
   the terminal is placed to extend from an inside to an outside of a housing that is placed in an environment exposed to liquid fuel;
   the seal film-seals between the housing and the electrically conductive member; and
   a connecting portion of the electrically conductive member, which connects between the electrical connection and the intermediate portion, is placed into a through-hole of the housing along with the intermediate portion.

7. The terminal according to claim 6, wherein the seal film is formed on the connecting portion in addition to the intermediate portion.

* * * * *